United States Patent
Allison et al.

[11] Patent Number: 5,901,561
[45] Date of Patent: May 11, 1999

[54] FAULT RESTART METHOD

[75] Inventors: Matthew W. Allison; William J. Black, both of Gurnee; Christopher J. Wilson, Lindenhurst, all of Ill.

[73] Assignee: Scotsman Group, Inc., Vernon Hills, Ill.

[21] Appl. No.: 08/873,633

[22] Filed: Jun. 12, 1997

[51] Int. Cl.⁶ ........................................... F25C 1/00
[52] U.S. Cl. .................. 62/126; 62/129; 62/138; 62/158; 62/233
[58] Field of Search ............................. 62/125, 126, 127, 62/129, 130, 157, 158, 233, 353, 354, 135, 136, 137, 138, 228.2

[56] References Cited

U.S. PATENT DOCUMENTS

| | | | |
|---|---|---|---|
| 3,298,192 | 1/1967 | Morgan | 62/158 |
| 3,312,081 | 4/1967 | Berger et al. | 62/158 |
| 4,038,061 | 7/1977 | Anderson et al. | 62/126 |
| 4,550,572 | 11/1985 | Schulze-Berge | 62/138 |
| 4,573,325 | 3/1986 | Chiu et al. | 62/129 |
| 4,709,292 | 11/1987 | Kuriyama et al. | 361/22 |
| 4,774,814 | 10/1988 | Yingst et al. | 62/126 |
| 4,785,641 | 11/1988 | McDougal | 62/233 |
| 4,928,500 | 5/1990 | Funahashi et al. | 62/193 |
| 4,936,105 | 6/1990 | Takechi et al. | 62/129 |
| 4,939,909 | 7/1990 | Tsuchiyama et al. | 62/158 |
| 5,035,118 | 7/1991 | Hara | 62/126 |
| 5,182,925 | 2/1993 | Alvarez et al. | 62/347 |
| 5,237,837 | 8/1993 | Naruse et al. | 62/434 |
| 5,289,691 | 3/1994 | Schlosser et al. | 62/78 |
| 5,303,560 | 4/1994 | Hanson et al. | 62/126 |
| 5,408,834 | 4/1995 | Schlosser et al. | 62/78 |
| 5,454,229 | 10/1995 | Hanson et al. | 62/126 |
| 5,463,874 | 11/1995 | Farr | 62/126 |
| 5,477,694 | 12/1995 | Black et al. | 62/73 |
| 5,491,978 | 2/1996 | Young et al. | 62/126 |
| 5,586,446 | 12/1996 | Torimitsu | 62/126 |

FOREIGN PATENT DOCUMENTS

| | | |
|---|---|---|
| 63-65246 | 3/1988 | Japan . |
| 2-143048 | 6/1990 | Japan . |
| 6-194015 | 7/1994 | Japan . |

Primary Examiner—Harry B. Tanner
Attorney, Agent, or Firm—Harness, Dickey & Pierce, PLC

[57] ABSTRACT

A fault restart routine for an icemaker having a microprocessor-based system controller. The fault restart routine provides at least a limited number of attempts at automatically restarting the icemaker after a shutdown has occurred because of a detected fault condition. If the fault condition is not a water inlet fault, the routine waits a first predetermined period of time before attempting to restart the icemaker. If the fault is detected as being a water inlet fault, then the system controller waits for a second predetermined time period before restarting the icemaker. If after restarting the icemaker, the icemaker completes one complete cycle of operation (i.e., a complete FREEZE cycle and a complete HARVEST cycle), then the fault restart routine is exited and a previously generated fault code is cleared. If the icemaker does not full one complete cycle of operation within a predetermined number of restart tries, then the system controller generates a fault signal to the LED display and no further attempts at restarting the icemaker are made. The method alleviates the need for an operator or attendant to manually attempt to restart the icemaker in the event a fault condition occurs, which fault condition may only be temporary and/or due to environmental conditions such as power surges or brown-outs, and which does not require operator intervention. The method further protects the icemaker by automatically shutting down the icemaker if after the predetermined number of restart tries the fault condition is still present.

9 Claims, 4 Drawing Sheets

FAULT RESTART METHOD

BACKGROUND OF THE INVENTION

1. Technical Field

This invention relates to a method of automatically restarting operation of an icemaker after a fault has been detected, and if proper operation cannot be resumed within a predetermined number of restart tries, using the controller to generate a fault signal to an operator.

2. Discussion

Icemakers are used in a wide variety of commercial and residential applications. In commercial applications, icemakers are often used to produce large quantities of ice on a daily basis. In most instances, such icemakers operate continuously (i.e., 24 hours per day) such as in restaurants, hotels and in convenience stores.

On occasion, fault conditions may develop with commercial icemakers which necessitate resetting or restarting the icemaker. These fault conditions are often not serious fault conditions which necessitate the attendance of a qualified service person to restart the icemaker. Often, these fault conditions are relatively minor and may be due to such factors as electrical surge or brown-out conditions which could temporarily stress various operating components of the icemaker. Such conditions can also disrupt operation of the icemaker resulting in temporarily insufficient or excessive water levels in the water sump, temporarily excessively high or low temperatures of the gaseous refrigerant discharged from the compressor, etc.

If any one of the above-mentioned or other like faults occur, heretofore developed icemakers often generate a fault signal which indicates to the owner, attendant or other person of a business establishment where the icemaker is located that qualified service personnel is needed to correct the problem. Other icemakers, upon detecting one or more of the above-mentioned fault conditions, require the operator to manually initiate some form of a restart operation or sequence which allows the icemaker to attempt to continue operation. In either instance, often the fault condition will abate within 15–60 minutes following its initial occurrence. If a service person has been summoned to the business establishment where the icemaker is located, and the fault condition has abated, this represents a cost to the establishment owner that is not needed. If the employee or attendant of the business establishment is required to initiate a manual reset operation, this results in added inconvenience to the employee or attendant and the need to pay relatively close attention to the icemaker in the event a fault condition develops so that a quick attempt can be made at restarting the icemaker. Obviously, if the employee or attendant is not paying close attention to the operation of the icemaker, a fault condition could develop which interrupts operation of the icemaker for an undesirably long period of time. Especially in summer months, such an occurrence can be particularly troubling where very large quantities of ice are needed on a daily basis.

It would therefore be very highly desirable to provide an icemaker having the capability of waiting for a predetermined time period before automatically attempting to restart operation after a fault condition has occurred. This would provide time for the operating anomaly (e.g., power surge or brown-out condition) to abate and alleviate the need for an employee or other attendant to manually reset the icemaker or to periodically check on the operation of the icemaker in the event the icemaker has experienced a fault condition that requires a reset or restart command for continued operation.

It would also be highly desirable to provide the capability to automatically attempt a restart operation a predetermined number of times after the icemaker has shut down because of a detected fault condition, before determining that a detected fault condition is one that requires the attention of qualified service personnel, rather than being due to a temporary fault condition. An icemaker which automatically attempts to restart, at least a limited number of times, before signalling a fault condition to an operator or attendant, would insure that service personnel are not summoned when only a temporary fault condition existed which does not require the attention of qualified service personnel, but which could be removed by simply performing one, two or more restarts of the icemaker over a time period sufficient to allow the temporary fault condition to abate.

It is still a further object of the present invention to provide a method for restarting operation of an icemaker after a fault condition has occurred causing the icemaker to shut down, which does not add appreciably to the overall cost of the icemaker, to its overall size, and which does not require any input from an operator or attendant before attempting to perform an automatic restart of the icemaker for a predetermined, limited number of times.

SUMMARY OF THE INVENTION

The above and other objects are provided by an automatic restart method for restarting operation of an icemaker after a fault condition has caused the icemaker to shut down, in accordance with preferred methods of the present invention. The preferred methods provide a limited number of time delays and attempted restarts of the icemaker after a controller of the icemaker has detected a fault condition and shut down the icemaker. If after a limited number of attempts at restarting the icemaker the fault condition is still present, the methods of the present invention involve using the controller to signal that a fault condition has occurred and to shut down the icemaker. When this fault signal is provided, an operator or attendant of the icemaker is assured that the fault condition is one which will likely require the attention of qualified service personnel. The automatic shut down further ensures that the various components of the icemaker will not be damaged due to temporary power anomalies such as power surges or brown-out conditions.

One method of the present invention generally involves incrementing a fault counter when a fault condition is detected which has caused the icemaker to shut down. A controller of the icemaker then waits a predetermined period of time before executing a restart sequence or routine. After the predetermined time period has expired, the controller executes the restart routine and an attempt is made to execute one complete cycle of operation (i.e., one complete "freeze" and one complete "harvest"). If one complete, subsequent cycle of operation is not completed without another fault condition being detected, then the fault counter is incremented and the controller again waits for the predetermined time period before executing the restart routine a second time. If a second restart of the icemaker results in a fault condition occurring before one complete cycle of operation is completed, then the fault counter is again incremented.

If after a predetermined number of times (i.e., "tries") at restarting the icemaker a fault condition still occurs before finishing one complete cycle of operation, then the controller shuts down the icemaker. No further attempts at automatically restarting the icemaker are made.

In another preferred embodiment of the present invention a second timer is also included. The first timer is started if the fault condition was due to a water inlet fault. If the fault condition was not due to a water inlet fault, then the second timer is started. In this manner, different time periods can be selected as delay times, depending on the type of fault detected, before executing the restart routine.

All of the above-described embodiments provide the advantage of waiting a predetermined length of time after the icemaker has shut down due to a fault condition, and then attempting to restart the icemaker, and execute one complete cycle of operation, at least a limited number of times. In this manner the operator or attendant can be insured that the fault condition is not one which requires the immediate attention of service personnel. The method of the present invention also does not require any input from an operator or attendant before attempting to restart the icemaker if a fault condition has occurred. A restart can be attempted relatively quickly after the fault condition has occurred regardless if the operator or attendant is aware that the fault condition has occurred, and even if the operator or attendant is too busy at the time to attempt to address the problem.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
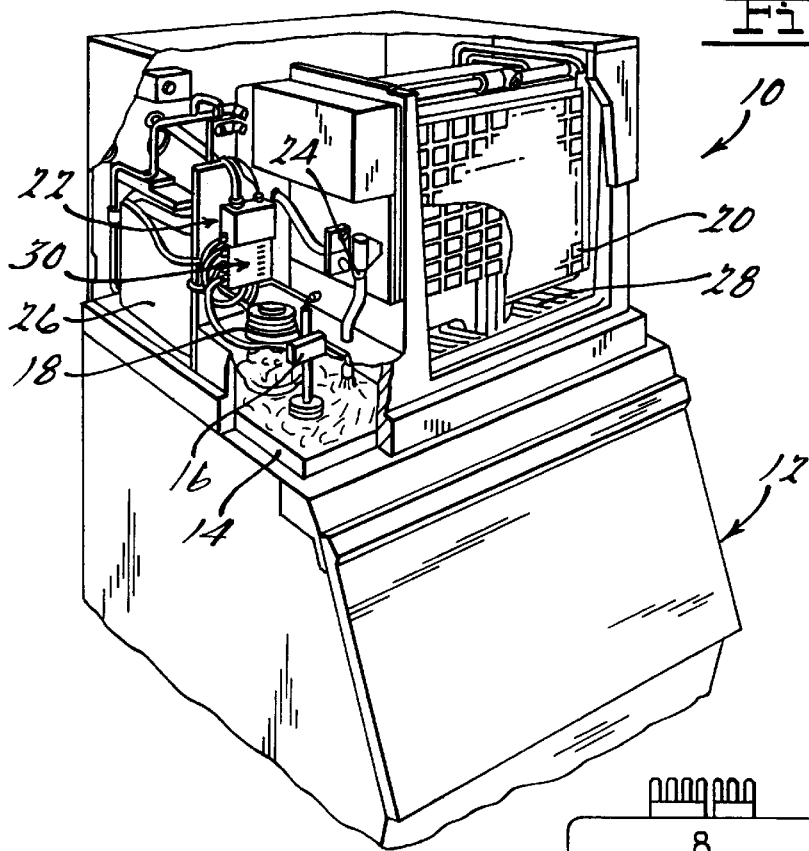
FIG. 1 is a fragmentary perspective view of an icemaker positioned atop an ice bin, wherein the icemaker includes a system controller operated in accordance with a preferred method of the present invention.

Referring to FIG. 1, there is shown an icemaker 10 positioned on an ice bin 12. The icemaker 10 generally includes a water sump or reservoir 14 for containing a quantity of water therein, a water level sensor 16 in the form of a float for providing an indication of the level of water in the sump 14, and a water pump 18 for pumping the water in the sump up and over a plurality of evaporators 20. The water level sensor 16 provides a signal to a system controller 22 which uses the amount of water removed from the reservoir 14 as an indication of when it is time to enter a "HARVEST" cycle of operation. The system controller 22 also controls a water inlet valve 24 in order to admit water into the sump 14 as needed during "FREEZE" and "CLEAN" cycles of operation of the icemaker 10.

The system controller 22 also controls operation of a compressor 26 which forces the refrigerant to flow through the evaporators 20 and the condenser (not shown) of the icemaker. Lastly, a cube deflector 28 is provided which allows water running over the top of the evaporators 20 to fall through slots formed in the cube deflector 28 back into the sump 14, while causing ice which is released from the evaporators 20 during the harvest cycle to be directed into the ice bin 12 for temporary storage.

The icemaker 10 can be viewed as having generally two major cycles of operation once powered up: FREEZE and HARVEST. In the FREEZE cycle, the water pump 18 and the compressor 26 are both turned on by the controller 22 to cause the water pump to pump water up to the tops of the evaporators 20 such that the water runs over the evaporators, which are being chilled by refrigerant running therethrough, to form ice cubes on the evaporators 20. The system controller 22 detects that the ice cubes are of sufficient size by signals received from the water level sensor 16 indicating the amount by which the water level in the sump 14 has dropped during the FREEZE cycle. Once a predetermined amount of water has been withdrawn from the water sump 14 during the FREEZE cycle, the controller 22 causes the HARVEST cycle to be entered.

In the HARVEST cycle hot gas is directed from the compressor 26 through a hot gas solenoid valve (not shown) and into the evaporators 20 to heat the evaporators 20. Heating of the evaporators 20 eventually causes the ice cubes formed thereon to fall from the evaporators 20 onto the cube deflector 28 and into the ice bin 12. The hot gas from the compressor 26 is circulated through the evaporators 20 for a predetermined time to insure that all of the ice cubes have been released from the evaporators 20. More detailed information on the general operation of the icemaker 10 is provided in Appendix "A" appended hereto. It will be appreciated that the above description has been meant merely as an overview of the operation of the icemaker 10 and to provide a framework for the description of the method of the present invention to be described herein.

Figure 2:
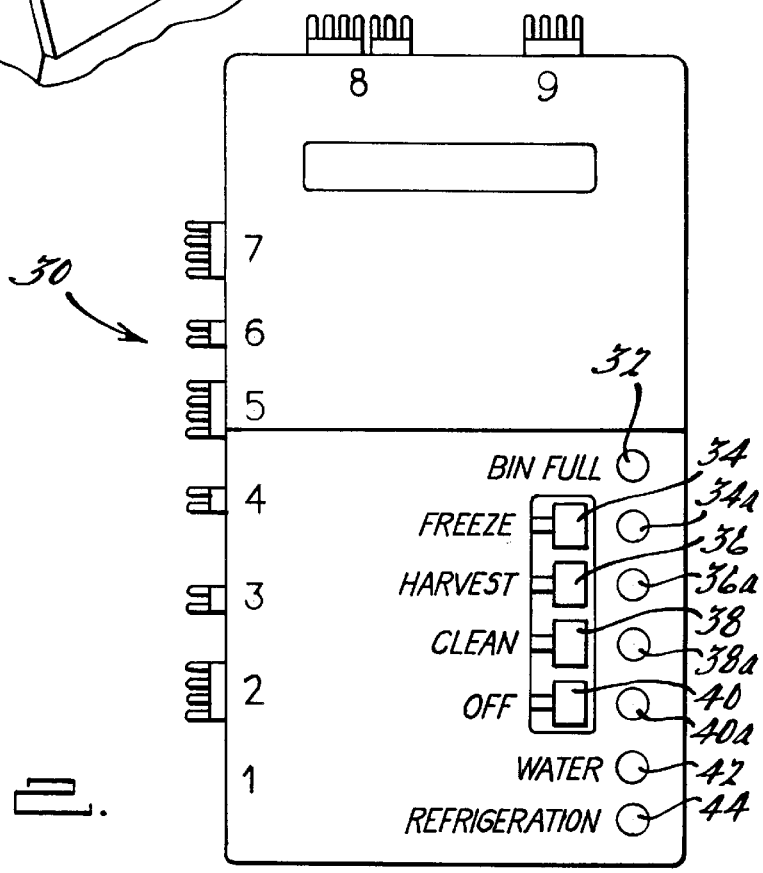
FIG. 2 is a view of the control panel of the system controller providing the user accessible switches for initiating specific cycles of operation of the icemaker in manual fashion.

With brief reference to FIG. 2, the system controller 22 includes a control panel 30 having a plurality of indicator lights and manually actuatable push button switches 34–40. In one preferred form the indicator lights are LED indicators 34a–40a indicating "BIN FULL", "FREEZE", "HARVEST", "CLEAN", "OFF", "WATER" and "REFRIGERATION". Switches 34–40 may be actuated manually by a user. Pushing and releasing any one of pushbuttons 34–40 causes the selected function to be executed. LED indicators 42 (WATER) and 44 (REFRIGERATION) are provided to indicate fault conditions associated with a "water inlet fault" and a "refrigeration" fault, respectively. The "BIN FULL" LED, when illuminated, indicates that the ice bin 12 (FIG. 1) is full.

Figure 3:
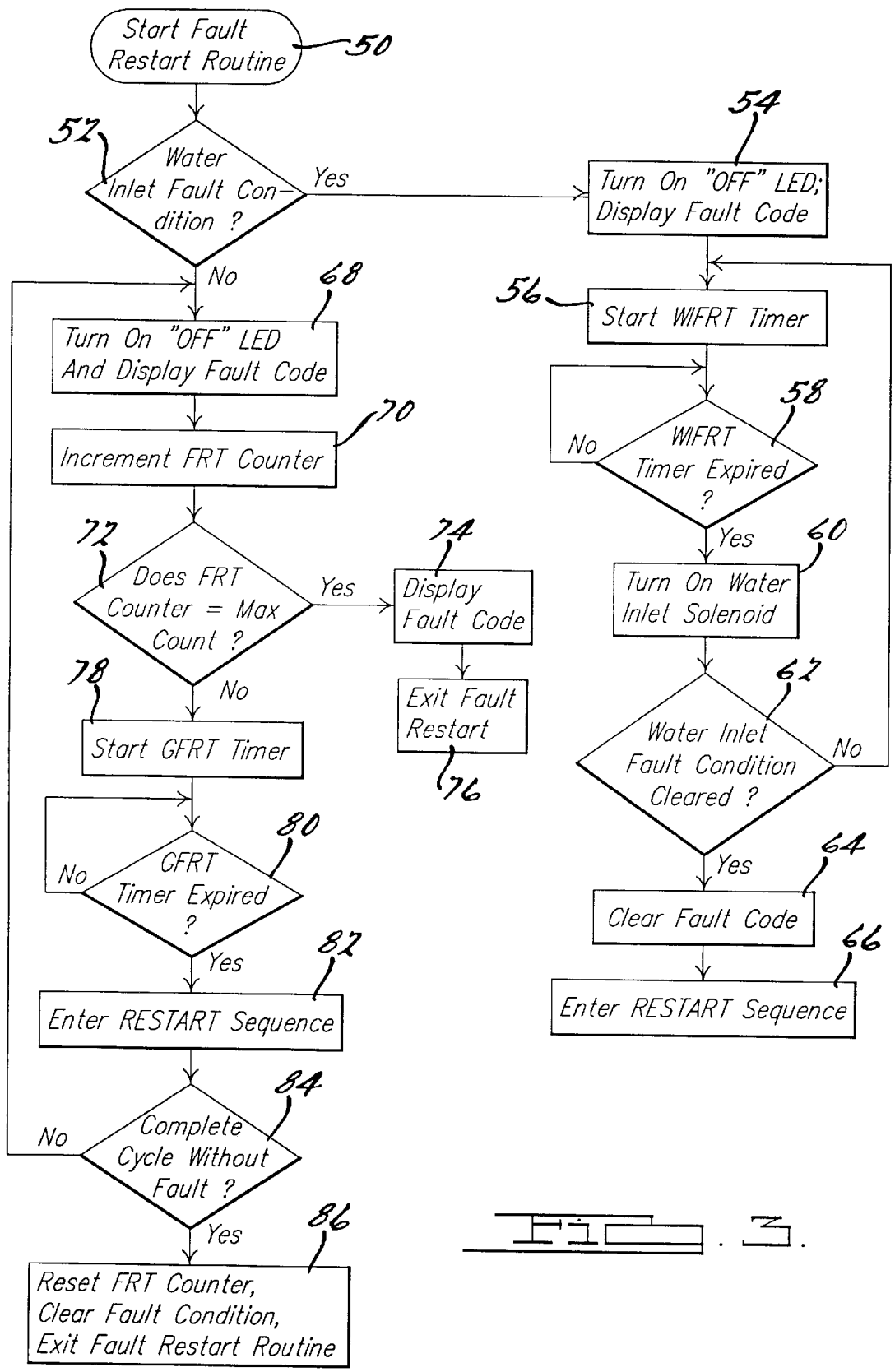
FIG. 3 is a flowchart illustrating a preferred method of the present invention which enables a limited number of restarts of the icemaker to be attempted automatically upon sensing of a fault condition which has caused a shutdown of the icemakers.

Referring now to FIG. 3 a fault restart routine 50 is illustrated in accordance with a preferred method of the present invention. The fault restart routine is entered whenever a fault is detected in the operation of the icemaker 10 which has caused the icemaker 10 to shut down. In brief, the Fault Restart Routine 50 causes the system controller 22 to wait for a predetermined time period and then to restart the icemaker 10, and to repeat this process a limited number of times in an effort to automatically resume operation of the icemaker.

When a shutdown occurs, the system controller 22 turns off the compressor 26, the fan motor (not shown) or liquid line solenoid (not shown), the water pump 18, and closes the hot gas solenoid (not shown) and the water inlet solenoid valve 24. The hot gas solenoid is the solenoid valve disposed in the discharge line between the compressor discharge port and the input side of each of the evaporators 20, as is well known in the art.

With continued reference to FIG. 3, once a fault condition has been detected a fault flag is set in the system controller 22, and a check is made to determine if the detected fault is a "water inlet fault" as indicated at step 52. A "water inlet fault" is a fault involving the water inlet solenoid valve 24 (in FIG. 1) or a fault indicating that the water level in the sump 14 is too low. If this inquiry is "yes", then the system controller 22 turns on the "OFF" LED (FIG. 2) and displays a fault code by lighting the "WATER" LED 42 (FIG. 2), as indicated at step 54. A WATER INLET FAULT RESTART TIME (WIFRT) timer is started, as indicated at step 56 and the system controller 22 waits for the predetermined WIFRT time period, as indicated at step 58, before turning on the water inlet solenoid valve 24, as indicated at step 60. The WIFRT timer is a timer having a duration of preferably about 20 minutes. A check is then made to determine if the water inlet fault condition has been cleared, as indicated at step 62 and, if so, the water inlet fault code is cleared, as indicated at step 64 and a "RESTART" sequence is initiated, as indicated at step 66. A description of the sequence of operation of the RESTART routine can be found at sections 2.5–2.5.6.4 in Appendix A.

With further reference to FIG. 3, if the inquiry at step 52 produces a "no" answer, then it is assumed that a "general fault condition" has occurred. A "general fault condition" is one which, for example, might include a sensed fault condition involving the bin level sensor (not shown) of the icemaker 10, an excessively high discharge temperature of the gaseous refrigerant discharged from the compressor 26, or if the HARVEST cycle is sensed as not having been completed within a predetermined time period.

When a general fault condition has been detected, the system controller 22 turns on the "OFF" LED (FIG. 2) and displays a fault code by illuminating the "REFRIGERATION" LED 44 in FIG. 2, as indicated at step 68. A FAULT RESTART TRIES (FRT) counter is then incremented, as indicated at step 70, and the system controller 22 then checks to determine if the FRT counter equals a maximum preset count or value, as indicated at step 72. The FRT counter is a counter which keeps track of the number of times the icemaker 10 is restarted by the system controller 22 while in the fault restart routine 50. The maximum count or value of restart tries is a value in the EEPROM of the system controller 22 that determines how many consecutive times the controller 22 will attempt to restart the icemaker 10 after encountering a fault other than a water inlet fault. In the preferred method, this value is two, indicating that at least two restart tries are attempted automatically by the system controller 22.

Assuming that the fault condition has just occurred and that, previously, the icemaker 10 had been operating properly, the FRT counter, at this point, will only have a value of "1". Accordingly, the inquiry at step 72 will produce a "no" answer. If the situation was otherwise, that is, if two restarts have already been made and the detected fault is one which does not involve a water inlet fault, then a third attempt at a restart would produce a "yes" answer at step 72. In this event, the system controller 22 would display a fault code, as indicated at step 74, and subsequently exit the Fault Restart Routine, as indicated at step 76. No further attempts at automatically restarting the icemaker 10 would be made by the system controller 22. At this point, the intervention of an operator or attendant would be required to manually reset the icemaker 10 by pressing the "OFF" button 40 (FIG. 2) to reset the icemaker before further restarts could be attempted.

With further reference to FIG. 3, if the FRT counter does not equal the maximum count as checked at step 72, then a GENERAL FAULT RESTART TIME (GFRT) timer is started, as indicated at step 78. In one preferred method the GFRT timer has a predetermined duration of preferably about 50 minutes. It will be appreciated, however, that the predetermined duration of the GFRT timer, as well as the duration of the WIFRT timer, could vary considerably. The predetermined time periods of the GFRT timer and the WIFRT timer thus represent the time delays which the system controller 22 waits after detecting either a water inlet fault or a general fault, respectively, before attempting to restart the icemaker 10.

With continued reference to FIG. 3, the system controller 22 waits until the GFRT timer has expired, as indicated at step 80, and then enters the RESTART sequence, as indicated at step 82. After the RESTART sequence has been entered, the system controller 22 monitors operation of the icemaker 10 to determine if one complete cycle of operation is executed without another fault being detected, as indicated at step 84. One complete subsequent cycle refers to a complete FREEZE cycle and a complete HARVEST cycle being executed without incurring any additional faults. If the icemaker was previously in the HARVEST cycle when the fault occurred, then it must execute one complete FREEZE cycle and follow with one complete HARVEST cycle without any further faults being detected. If the answer to the inquiry at step 84 is "yes", then the system controller 22 resets the FRT counter, clears the fault condition and exits the Fault Restart Routine, as indicated at step 86.

It will be appreciated then that the Fault Restart Routine 50 causes the system controller 22 to automatically initiate at least a limited number of restarts of the icemaker 10 if the icemaker shuts down because of a detected fault condition. If the fault is a water inlet fault, no limit is placed on the number of restarts which the system controller 22 will attempt; only that the system controller 22 wait for a predetermined time (about 20 minutes) before attempting each restart. If the detected fault is a fault other than a water inlet fault, the system controller 22 is required to wait for a second predetermined time period (i.e., about 50 minutes) before attempting each restart. Only a predetermined number of restarts will be made if the fault detected is a fault other than a water inlet fault. It will also be appreciated that the predetermined times for the WIFRT timer and the GFRT timer could be varied significantly if desired. The times of 20 minutes and 50 minutes for the WIFRT timer and GFRT timer, respectively, have been selected because they represent time periods which have been found to be sufficient to allow various fault conditions to abate.

It will also be appreciated that the invention is not limited to the sensing of only certain types of faults. The method of the present invention can be used in connection with virtually any form of sensing device(s) to provide a number of restart tries before shutting down the icemaker 10. Still further, while the present invention categorizes the type of fault as either a water inlet fault or some other form of fault, it will be appreciated that a greater or lesser categorization of the specific types of faults could be implemented, and a greater or lesser number of different time delay periods incorporated depending on the categorization of the sensed fault. Even further, the length of the time delay periods could be reduced or lengthened depending on the number of previous attempts at restarting the icemaker. Different numbers of restart tries could also be implemented depending on the type or categorization of detected fault.

Figure 4:
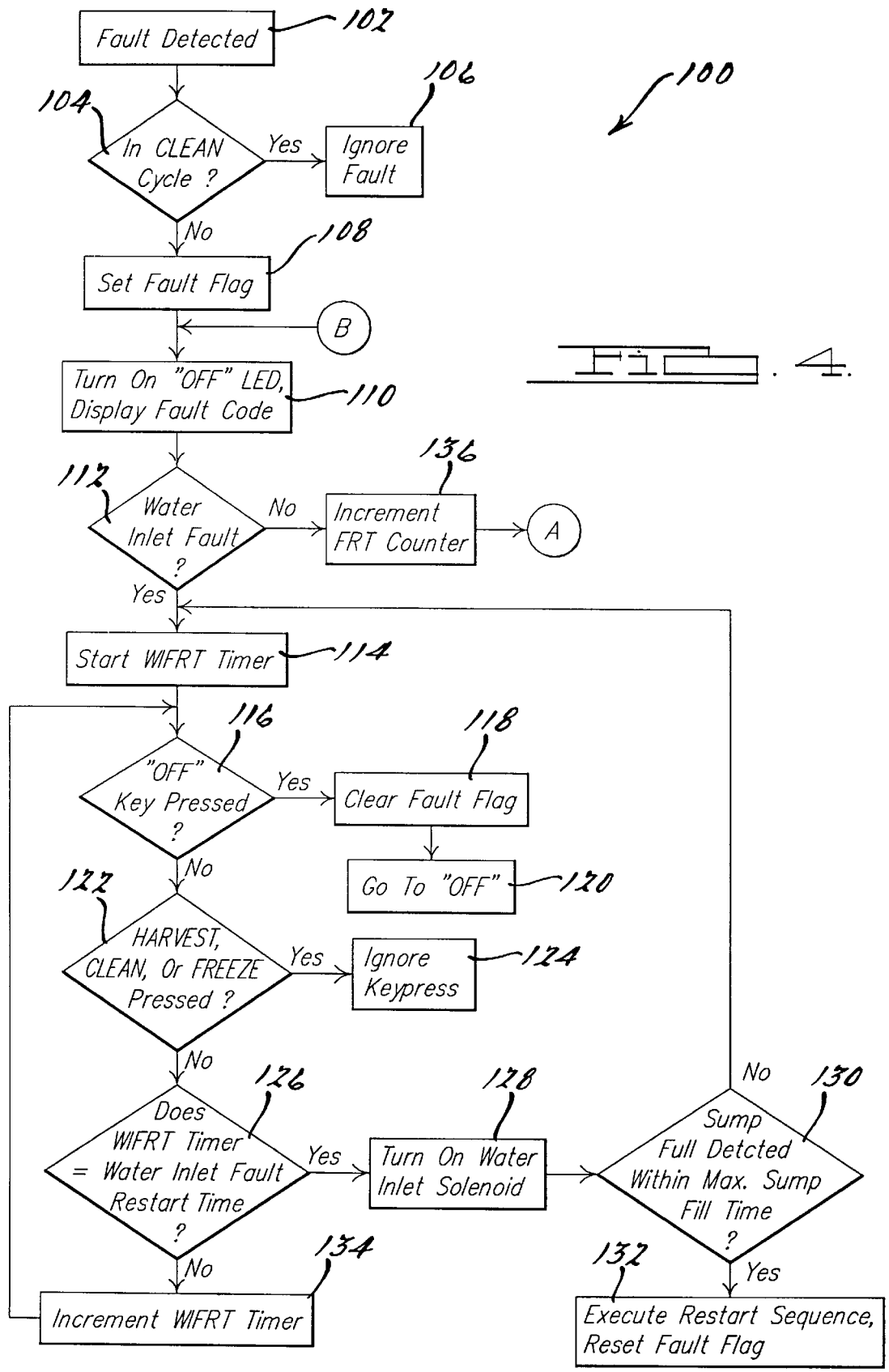
FIGS. 4 and 5 illustrate an alternative preferred method of the present invention.
Figure 5:
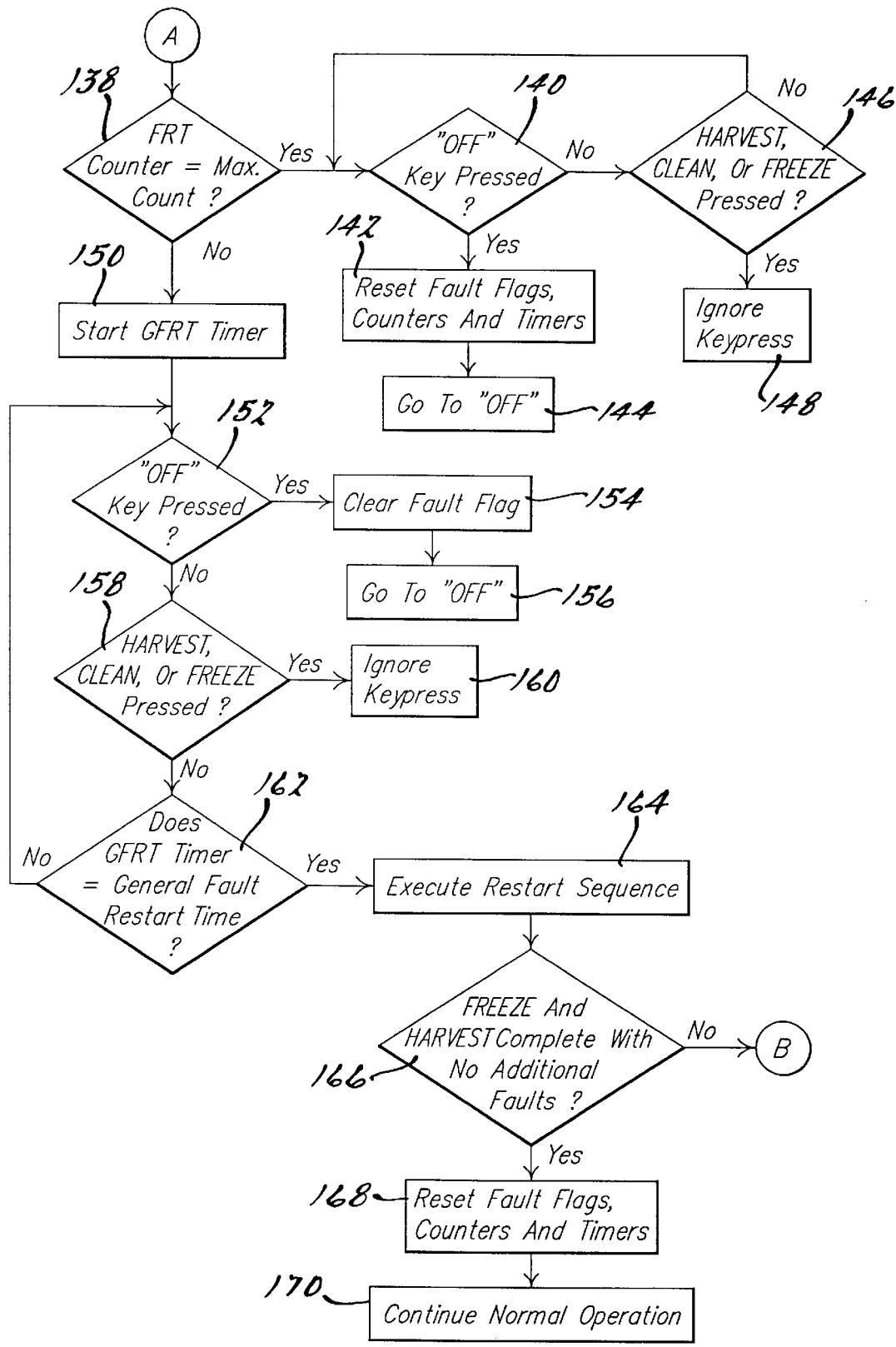

Referring now to FIGS. 4 and 5, there is shown a fault restart method 100 in accordance with an alternative preferred method of the present invention. The method 100 provides the time delays and limited number of automatic restarts described in connection with the fault restart routine 50, but also includes an even greater degree of intelligent control.

With specific reference to FIG. 4, after the icemaker 10 has detected a fault condition, as indicated at step 102, an inquiry is made if the fault occurred while the icemaker 10 was in the "CLEAN" cycle of operation, as indicated at step 104. If this inquiry produces a "yes" answer, then the fault condition is ignored, as indicated at step 106, and operation of the icemaker 10 is continued. If the inquiry produces a "no" answer, then a fault flag is set, as indicated at step 108, and the "OFF" LED is turned on and a fault code is displayed, as indicated at step 110. An inquiry is then made to determine if the detected fault is a "water inlet fault" as indicated at step 112. If it is, then the WIFRT timer is started, as indicated at step 114.

After the WIFRT timer is started at step 114, the OFF switch is checked, as indicated at step 116, to determine if it has been depressed. If so, the fault flag previously set is cleared, as indicated at step 118 and the icemaker 10 enters the OFF mode, as indicated at step 120. If the inquiry at step 116 produces a "no" answer, the HARVEST, CLEAN and FREEZE switches are checked to determine if any one of these switches has been depressed by the operator, as indicated at step 122. If any one of these switches is detected as being depressed, the function associated with the depressed switch is ignored, as indicated in step 124. If the answer to the inquiry in step 122 is "no", then a check is made to determine if the WIFRT timer is timed out, as indicated at step 126. If so, the water inlet solenoid valve 24 is turned on to admit water into the sump 14, as indicated at step 128. A check is then made to determine if the sump 14 is full within a maximum "SUMP FILL TIME", as indicated at step 130. If the sump 14 is detected as being full within the SUMP FILL TIME, then the restart sequence is executed and the fault flag is reset, as indicated at step 132. If the sump is not detected as being full within the SUMP FILL TIME at step 130, then a jump is made back to step 114 and the WIFRT timer is restarted, as indicated at step 114, and steps 116, 122 and 126 are repeated. If the inquiry at step 126 produces a "no" answer, indicating that the WIFRT timer has not timed out, then the WIFRT timer is incremented, as indicated at step 134 and the switches are again checked at steps 116, 122 and 126.

With further reference to FIG. 4, if the inquiry at step 112 indicates that the fault is not a "water inlet fault", then the FRT counter is incremented, as indicated at step 136. Referring now to FIG. 5, and a check is then made to determine if the FRT counter equals the maximum FRT count or value, as indicated at step 138. If this inquiry produces a "yes" answer, then the OFF key is checked to determine if it has been pressed by the operator, as indicated at step 140. If so, the fault flag is reset, the FRT counter is reset and both the GFRT and WIFRT timers are reset, as indicated at step 142. The icemaker 10 then enters the OFF state, as indicated in step 144. If the inquiry at step 140 indicates that the OFF key has not been pressed, then the FREEZE, CLEAN, and HARVEST switches are checked to determine if any one of these switches has been pressed, as indicated in step 146. If so, the depressed key is ignored, as indicated at step 148. If none of these switches has been pressed, then a jump is made back to step 140 to again check if the OFF switch has been pressed.

With further reference to FIG. 5, if the FRT counter does not equal the maximum FRT value or count, as checked at step 138, then the GFRT timer is started, as indicated at step 150. The OFF key is then checked to determine if it has been pressed, as indicated at step 152. If so, the fault flag is cleared, as indicated in step 154, and the machine enters the OFF mode, as indicated at step 156. If the HARVEST, CLEAN or FREEZE switches are pressed, as indicated at step 158, the depressed key is ignored, as indicated at step 160. A check is then made to determine if the GFRT timer has timed out, as indicated at step 162 and, if so, the fault restart sequence is executed, as indicated at step 164. After executing the fault restart sequence, a determination is made if one complete FREEZE cycle and one complete HARVEST cycle are executed with no additional faults, as indicated at step 166. If so, the fault flag, FRT counter and the timers are reset, as indicated at step 168 and normal operation is continued, as indicated at step 170. If another fault is detected before one complete FREEZE and one complete HARVEST cycle is executed, then a jump is made back to step 110 in FIG. 4 where the OFF LED is turned on and a fault code is displayed.

Appendix A, as follows, provides an even more detailed description of the various cycles of operation of the icemaker 10:

1.3 Definitions

ANTI-SLUSH PUMP OFF TIME: The length of time that the water pump turns off for in order to promote the freezing of water to the evaporator plates during the freeze cycle.

ANTI-SLUSH ENABLE CYCLES: The number of freeze cycles in which the anti-slush feature is allowed to operate once the compressor is turned back on.

BIN EMPTY TIME: The amount of time that the controller remains in a Bin Full mode after the bin full condition is removed.

BIN FULL MIN: The amount of time that the Bin Full sensors must be blocked in order to register a bin full condition.

CHECKSUM: The binary value stored in EEPROM address 0 which when summed with EEPROM addresses 1 through 63 yields a binary value with the lower 8 bits of the summation equal to 255.

CLEAN RINSE TIME: The time which the sump water is circulated through the water distribution system before being flushed with fresh inlet water.

CLEAN RINSE FILL TIME: The time the water solenoid is opened to purge the system during the rinse cycle in CLEAN.

DISCHARGE RATE MAX: Maximum necessary rate that the discharge temperature must rise during the Freeze cycle.

DISCHARGE TEMP VALUE: Temperature value used to determine the End-Of-Cycle Fan Off Delay time to be used.

DISCHARGE TEMP DELTA: Minimum necessary increase in discharge line temperature in order to prevent a fault in operation from being assumed.

DISCHARGE TEMP MAX: Maximum allowable temperature seen by the Discharge Temperature Sensor for normal operation. An over heating failure of the discharge gas is assumed above this temperature.

END-OF-CYCLE FAN OFF DELAY: The time at the completion of a Freeze cycle where the condenser fan is turned off.

EOCFOD VALUE (1–4): Time value used to control how long the condenser fan will remain off at the end of a Freeze cycle.

FAULT RESTART TRIES: An EEPROM value that determines how many consecutive times the controller will restart after encountering a fault other than a water fault.

FLUSH % VALUE: The stored EEPROM value at address 65 identifying which of the five flush percentages is to be used for determining system flush times.

FAN OFF DELAY SET UP TIME: The time into the Freeze cycle at which the End-Of-Cycle Fan Off Delay time, Fan cycling in Freeze and % Harvest Delay are determined.

FIXED TIME DELAY BEFORE PUMP OFF: In harvest, the time after time to last cube from the previous harvest cycle, when the water pump is turned off to prevent water cascading.

FREEZE SUMP REFILL VALUE: For systems that require more water deposited to the evaporator plates than what the sump can hold, it is the number of times that the sump will refill with water before initiating a Harvest sequence.

FREEZE SUMP TEMP DROP DELTA: Minimum necessary decrease in sump water temperature during freeze in order to prevent a fault in operation from being assumed.

FREEZE SUMP TEMP DROP TIME: The time into the Freeze cycle at which the temperature drop of the sump water is tested to determine if a fault condition exists.

FREEZE TIME MAX: Maximum allowed time for a freeze cycle to run before a fault in operation is assumed.

GENERAL FAULT RESTART TIME: The time the controller remains in the off mode after it encounters a fault prior to restarting. Sixteen times multiplier.

HARVEST BIN BLOCKAGE SENSE: The time value in a Harvest cycle used to determine if the Bin Full sensors detected a bin full situation as opposed to ice falling.

HARVEST DELAY TIME PERCENTAGE (1–3): A percentage of harvest time to last cube used to determine harvest delay time. Percent value is based on discharge temperature.

HARVEST DRAIN TUBE PURGE TIME: The delay time after the water pump is turned on in harvest. If the sump drops below full during this time, the sump is refilled before flushing is started.

HARVEST MAXIMUM TIME: The time in harvest where the system will shut down on fault due to harvest problems. The system must have two consecutive cycles where harvest maximum time is reached before shutting down.

HARVEST PUMP OFF TIME: The time at the beginning of a Harvest cycle where the water pump is turned off.

HARVEST TIME: The time in harvest prior to starting the harvest delay timer. Under normal operation, the HARVEST TIME is defined as the time to last cube of the previous harvest cycle.

LAST FAULT DETECTED: The stored EEPROM value at address 66 which identifies the last fault mode that was detected by the controller.

LAST OPERATING MODE: The stored EEPROM value at address 64 which identifies the operating mode that the controller was in prior to losing power.

MINIMUM HARVEST TIME DEFAULT: A value used as harvest time when the system does not have a valid time to last cube. This value is defined such that an acceptable harvest occurs under all environmental conditions.

RESTART HOT GAS VALVE CLOSED: The time during the Restart mode in which the hot gas valve remains closed.

RESTART HOT GAS VALVE OPEN: The time during the Restart mode in which the hot gas valve remains opened.

SUMP DROP TIME MAX: Maximum allowed time for the water level in the sump to drop below the sump full position when the water pump is turned on.

SUMP FILL TIME: Time necessary to fill the sump with water from the harvest level to the full level.

SUMP FILL TIME DEFAULT: Time value used as the sump fill time when the actual sump fill time has not yet been determined.

SUMP FILL TIME MAX: The maximum allowed time to fill the sump before a fault in operation is assumed.

SUMP TEMP LOW LIMIT: The temperature value used to determine if the sump water has dropped low enough to make ice.

VARIABLE FLUSH % VALUE (1–5): A percentage value used to calculate the length of time that the sump will be flushed with fresh water.

WATER DISTRIBUTION TUBE DRAIN TIME: The time that is needed to ensure that all water has drained from the distribution tube after the water pump is turned off.

WATER INLET FAULT RESTART TIME: The time that the controller remains idle in the Off mode before attempting to restart. This occurs only when shutdown was originally caused by the detection of a water inlet fault.

WATER VALVE LEAK TIME: The time that is waited in order to detect if the water inlet valve is leaking during freeze diagnostics.

2 OPERATIONAL SEQUENCE 2.1 Power Up

Initial Conditions:
Water Level . . . Unknown
Condenser Fan . . . Unknown
Water Inlet Solenoid . . . Unknown
Water Pump . . . Unknown
Compressor . . . Unknown
Hot Gas Solenoid . . . Unknown When power is applied the controller will go through an initialization process. All display LED's will respond by first turning on for 1 second and then turning off for 1 second. During the initialization the controller will perform a self RAM check upon which a failure will result in a software reset. Secondly, the controller will detect whether it is receiving a 50 or 60 hertz signal and it will adjust its timing accordingly. Thirdly, the controller will check for a valid EEPROM checksum. An incorrect checksum will force the controller to remain in a shutdown state with outputs off until a valid checksum has been read eight consecutive times. An operating mode will then be selected which best duplicates the mode which was active when power to the controller was removed. All fault codes which were not previously acknowledged by the user will be displayed.

2.1.1 If the machine was previously in Shutdown, proceed to 2.4 (Shutdown Sequence). Controls shall be programmed to power up for the first time in the OFF mode.

2.1.2 If the machine was previously in any portion of the cleaning or rinsing cycles of CLEAN, or waiting for keypress in CLEAN, turn on the CLEAN indicator continuously, and proceed to 2.7.7 to initiate the rinse cycle.

2.1.3 If the machine was previously ON and in the Freeze or Harvest or Bin Full mode, proceed to 2.5 (Restart).

2.2 Freeze

The Freeze cycle shall be entered after normal Harvest cycle, Restart cycle, or after a bin full condition is cleared.

Initial Conditions:
Water Level . . . Unknown
Condenser Fan . . . Off
Water Inlet Solenoid . . . Closed
Water Pump . . . Unknown
Compressor . . . Unknown
Hot Gas Solenoid . . . Open 2.2.1 Turn on the "FREEZE" indicator. Measure and store Base Discharge Temperature and close the Hot Gas Solenoid.

2.2.2 Start the fan motor. The fan motor will run continuously throughout the cycle for remote applications.

2.2.3 Verify the sump is full and the water pump is on. If the sump is not full and/or the water pump is off then proceed to 2.2.3.1, otherwise turn on the compressor and proceed to 2.2.4.

2.2.3.1 Open the water inlet solenoid and allow sump to fill to sump full level. If sump full is not detected within SUMP FILL TIME MAX seconds, set the water inlet solenoid fault flag and proceed to 2.9.2 (Water Fault). If both the sump full and sump harvest beams are blocked, continue filling until only sump full beam is blocked or SUMP FILL TIME MAX seconds has elapsed.

2.2.3.2 Turn on the water pump and compressor if not previously on. Continue to fill until sump full is detected. If sump full is not detected within SUMP FILL TIME MAX seconds, set the water inlet solenoid fault flag and proceed to 2.9.2 (Water Fault).

2.2.3.3 Close the water inlet solenoid.

2.2.4 For non-remote applications, after FAN OFF DELAY SET UP seconds of operation in the freeze mode, check the discharge temperature and set the END OF CYCLE FAN OFF DELAY per the values stored in the EEPROM.

TABLE 2.2.4

End of Cycle Fan Off Delay Time Values

| Discharge Temperature | END OF CYCLE FAN OFF DELAY Time |
|---|---|
| <Discharge Temp 1 | EOCFOD 1 |
| Discharge Temp 1 - Discharge Temp 2 | EOCFOD 2 |
| Discharge Temp 2 - Discharge Temp 3 | EOCFOD 3 |
| >Discharge Temp 3 | EOCFOD 4 |

Note:
END OF CYCLE FAN OFF DELAY times and temperatures are defined in 2.11 EEPROM Locations and Timing Resolution Table.

If at FAN OFF DELAY SET UP TIME the discharge temperature is less than FREEZE FAN CYCLE DISCHARGE TEMP, run the fan for FREEZE FAN CYCLE ON TIME, then turn the fan off for FREEZE FAN CYCLE OFF TIME. Continue to cycle the fan on and off until SUMP HARVEST level is reached.

If the discharge temperature exceeds DISCHARGE TEMP MAX °F. in the Freeze cycle, set the High Discharge temperature flag and proceed to 2.9.1 (REFRIGERATION Fault).

2.2.5 If during freeze the bin full sensing beam is blocked continuously for BIN FULL MIN seconds, the sump level is above full, and SUMP TEMP LOW LIMIT has not been reached proceed to 2.8 (Bin Full).

2.2.6 If the sump temperature has not reached SUMP TEMP LOW LIMIT within FREEZE SUMP TEMP DROP TIME, perform the following diagnostics:

2.2.6.1 Compare the present sump temperature to the sump temperature at the start of Freeze. If the sump temperature has dropped by at least SUMP TEMP DROP DELTA °F. exit out of diagnostics and continue with Freeze. Otherwise, proceed to the next diagnostics step.

2.2.6.2 Compare the present discharge temperature to the base discharge temperature. If the discharge temperature has not risen by at least DISCHARGE TEMP DELTA °F., set the general refrigeration fault flag and proceed to 2.9.1 (REFRIGERATION Fault). Otherwise, proceed to the next diagnostics step.

2.2.6.3 Turn off the water pump and open the water inlet valve. If sump full is not detected within SUMP FILL TIME MAX seconds after opening the water inlet valve, set the water valve fault flag and proceed to 2.9.2 (WATER Fault). When sump full is detected, close the water inlet valve. When WATER DISTRIBUTION TUBE DRAIN TIME seconds has elapsed and sump full has been detected, turn on the water pump and wait SUMP DROP TIME MAX seconds. If the water level has not dropped below the sump full level by the end of SUMP DROP TIME MAX seconds, set the water pump fault flag and proceed to 2.9.2 (WATER Fault). If the water level has dropped then proceed to the next diagnostics step.

2.2.6.4 At WATER VALVE LEAK TIME seconds after the water pump was turned on, check the sump water level. If the water level has risen above the sump full level (possibly due to a leaking water valve), set the general water fault flag and proceed to 2.9.2 (WATER Fault). Otherwise, open the water inlet valve and fill the sump to the sump full level. If sump full is not detected within SUMP FILL TIME MAX seconds after opening the water inlet valve, set the water valve fault flag and proceed to 2.9.2 (WATER Fault). When the sump full is reached, close the water inlet valve and proceed to the next diagnostics step.

2.2.6.5 If this diagnostics step is reached, the control is unable to adequately diagnose a potential system problem (a possible cause could be a failed sump temperature sensor). Under this condition, the control should continue to run without going to shutdown as follows:

2.2.6.5.1 Turn on the Refrigeration Fault indicator. The indicator should remain on until this fault is cleared by pressing the OFF button.

2.2.6.5.2 The controller should operate as defined in section 2.9.3.1 Sump Temperature Fault. Keypress recognition will be limited to that described in section 2.13.

2.2.6.5.3 Reset the harvest fault flag and proceed to 2.3 (Harvest Cycle).

2.2.7 When the sump temperature reaches SUMP TEMP LOW LIMIT °F., turn off the water pump. After ANTI-SLUSH PUMP OFF TIME seconds, turn the water pump back on. Open the water inlet solenoid if the sump drops below full within SUMP DROP TIME MAX seconds after turning the pump back on. Close the water inlet solenoid once sump full is detected or SUMP FILL TIME MAX seconds has elapsed.

This feature should be enabled for ANTI-SLUSH ENABLE CYCLES number of freeze cycles after restarting the compressor. The number of freeze cycles should be programmable from 0 to 254, and if programmed to 255 the routine should be performed every cycle.

2.2.8 In order to make full size cubes in larger machines, it may be necessary to refill the sump FREEZE SUMP REFILL times during the freeze cycle. Once the water reaches the sump harvest level, open the water inlet solenoid. If sump full is not detected within SUMP FILL TIME MAX seconds, set the water inlet solenoid fault flag and proceed to 2.9.2 (Water Fault). Close the water inlet solenoid. Continue to refill the sump as noted until the sump has been refilled FREEZE SUMP REFILL time(s).

When the sump has been refilled the appropriate amount of times and the water reaches the sump harvest level, if the unit is a non-remote application, shut off condenser fan and wait END OF CYCLE FAN OFF DELAY seconds. If the freeze cycle exceeds FREEZE TIME MAX seconds, set the general fault flag and proceed to 2.9.1 (REFRIGERATION Fault), otherwise proceed to 2.3 (Harvest Cycle).

2.3 Harvest Cycle—Overflow Standpipe System 2.3.1 Turn on the HARVEST indicator, open Hot Gas Solenoid and start the Harvest Timer. Open the check valve bypass solenoid on remote for HARVEST BYPASS SOLENOID ON TIME. One of two EEPROM programmable numbers determined by discharge temp at FAN OFF DELAY/SET UP seconds. Turn on the compressor if previously off and turn off the condenser fan. Signal a Harvest in progress on Stacked System Transmit output by pulsing the output one second on and one second off during the Harvest mode.

2.3.2 Turn the water pump off. Open the water inlet solenoid after HARVEST WATER SOLENOID OFF TIME seconds. Allow the sump to fill for HARVEST SUMP FILL TIME seconds, or until sump full is reached (whichever happens first). Turn off the water inlet solenoid. If sump full is not detected within SUMP FILL TIME MAX seconds, set the water inlet solenoid fault flag and proceed to 2.9.2 (Water Fault). If both sump full and sump harvest beams are blocked, continue filling until only sump full beam is blocked or SUMP FILL TIME MAX seconds has elapsed. After the water pump has been off for HARVEST PUMP OFF TIME (variable EEPROM number; 5 values adjustable), turn on the water pump. Wait HARVEST DRAIN TUBE PURGE TIME. Flush as described in 2.3.3.

2.3.3 The flush time is a percentage of sump fill time. SUMP FILL TIME DEFAULT will be used if a sump fill time has not been measured. The flush level shall be adjustable, as described in 2.3.4.

2.3.3.1 If the sump full level is reached before turning the water pump on, record the time to fill the sump. Turn the pump on after HARVEST PUMP OFF TIME. After HARVEST DRAIN TUBE PURGE TIME, turn on the water inlet and fill the sump a second time until sump full is detected. The sump fill time is the time required to fill the sump the first time plus the time required to refill the sump after the water pump was turned back on. If the sump does not drop below full after HARVEST DRAIN TUBE PURGE TIME, record the sump fill time and begin flushing. Keep the water inlet solenoid open for the appropriate flush time. Close the water inlet solenoid.

2.3.3.2 If the sump full level is not reached prior to turning on the water pump, record the sump fill time normally. Keep the water inlet solenoid open once sump full is detected for the appropriate flush time. Close the water inlet solenoid.

2.3.4 Variable Flush Adjustment—Flush level shall be adjustable from OFF mode only. If the OFF switch is continuously pressed for greater than 3 seconds but less than 6 seconds (when the machine is in OFF mode), the control shall acknowledge that flush level may be adjusted by flashing all mode indicators for 1 second on, 1 second off. The control shall then turn on the appropriate indicators, per the table 2.3.4, to indicate the present flush level. Flush level shall be changed to the next higher level, or to the lowest level from the highest level, when the FREEZE switch is pressed and released. The control shall return to OFF mode when the OFF switch is continuously pressed for greater than 3 seconds but less than 6 seconds or after 60 seconds of no switch inputs. When in FLUSH ADJUSTMENT mode, only OFF and FREEZE (to adjust flush level only) switch inputs shall be recognized (ie. HARVEST, and CLEAN switch inputs shall be ignored).

TABLE 2.3.4

FLUSH LEVEL INDICATION

| | | INDICATOR LED'S | | | |
|---|---|---|---|---|---|
| FLUSH LEVEL | BIN FULL | FREEZE | HARVEST | CLEAN | OFF |
| 1 | off | off | off | off | on |
| 2 | off | off | off | on | on |
| 3 | off | off | on | on | on |
| 4 | off | on | on | on | on |
| 5 | on | on | on | on | on |

2.4 Shutdown Sequence 2.4.1 Shutdown can be initiated by:

2.4.1.1 pressing the OFF Switch for less than 3 seconds (pending shutdown) or for more than 3 seconds (immediate shutdown).

2.4.1.2 pressing the Harvest switch (Manual Harvest).

2.4.1.3 a fault condition.

2.4.2 Shut off the Compressor.

2.4.3 Shut off Fan Motor.

2.4.3.1 For air cooled models, turn fan on for two minutes. This allows refrigerant in the oil to boil off prior to shutting machine down.

2.4.4 Shut off Water Pump.

2.4.5 Close Hot Gas Solenoid.

2.4.6 Close Water Inlet Solenoid.

2.4.7 After shutting down, the unit will continue as follows:

Turn on "OFF" indicator and wait for switch input or WATER INLET Fault RESTART TIME minutes when shutdown was due to a Water Inlet Solenoid Fault or General Fault Restart Time Minutes when shutdown was due to any other condition.

2.4.7.1 If "CLEAN" is pressed, proceed to 2.7 (Clean).

2.4.7.2 If "HARVEST" is pressed, proceed to 2.6 (Manual Harvest).

2.4.7.3 If "FREEZE" is pressed, proceed to 2.5 (Restart)

2.4.7.4 If "OFF" is pressed for 3 or more seconds, proceed to 2.3.3 (Variable Flush Adjust).

2.4.7.5 If the system was shutdown on a Water Inlet Solenoid Fault and has been off for WATER INLET Fault RESTART TIME minutes (maximum of 68 minutes), proceed to 2.5 (Restart). An automatic restart after a water inlet fault is not performed if the fault occurred in clean.

2.4.7.6 If the system was shut down on any fault other than a Water Inlet Solenoid fault and has been off for GENERAL Fault RESTART TIME seconds (maximum of 68 minutes), proceed to 2.5 (Restart). If the system completes the next cycle with no faults, proceed without any shutdown or fault notification. This routine should be repeated Fault RESTART TRIES number of times. If the system encounters faults on Fault RESTART TRIES consecutive restarts, proceed to 2.4 and do not attempt any further restarts.

Note: It should still require two consecutive harvest faults for the machine to shut down on a harvest fault (i.e. two harvest faults per shutdown and three shutdowns would require six consecutive harvest faults to require button press reset). An automatic restart after a general fault is not performed if the fault occurred in clean.

2.5 Restart Sequence

The Restart sequence can be initiated by a software reset (watchdog timer), by pressing the FREEZE switch while in Shutdown, a timed period after a water inlet solenoid fault, or timed period after a General Fault, or by turning the power on.

Initial Conditions:
Water Level . . . Unknown
Condenser Fan . . . Unknown
Water Inlet Solenoid . . . Unknown
Water Pump . . . Unknown
Compressor . . . Unknown
Hot Gas Solenoid . . . Unknown 2.5.1 Blink the FREEZE indicator. Turn off the compressor, fan motor or liquid line solenoid and water pump. Open the Hot Gas Solenoid and start a timer set to restart HOT GAS VALVE OPEN seconds (EEPROM value) to equalize the system.

2.5.2 Open the Water Solenoid. If Sump Full is not detected within SUMP FILL TIME MAX sec., set the Water Inlet Solenoid fault flag and proceed to 2.9.2 (WATER Fault). If both the Sump Full and Sump Harvest beams are blocked, continue filling until only Sump Full beam is blocked or SUMP FILL TIME MAX seconds has elapsed. Set the Fill Time to SUMP FILL TIME DEFAULT seconds.

2.5.3 Turn on the Water Pump and wait SUMP DROP TIME MAX seconds. Leave the Inlet Solenoid open for the appropriate flush time (as defined in 2.3.3) after SUMP DROP TIME MAX seconds has elapsed. Close the Water Inlet Solenoid. This will put the water level at the overfill point prior to entering Freeze.

2.5.4 Wait remainder of RESTART HOT GAS VALVE OPEN seconds and close the Hot Gas Solenoid.

2.5.5 If restart is initiated by pressing the "FREEZE" switch (no harvest will be performed) proceed to 2.2 (Freeze).

2.5.6 If restart is initiated by power up after a power interruption during a Freeze or Harvest, or a software reset:

2.5.6.1 Turn on the Compressor. Wait RESTART HOT GAS VALVE CLOSED (EEPROM value) seconds, then open the Hot Gas Solenoid.

2.5.6.2 Measure the discharge temperature. Check discharge temperature every 10 seconds during the RESTART HOT GAS VALVE CLOSED period. If the rate of discharge temperature rise during any of the second intervals is greater than DISCHARGE RATE MAX, proceed to 2.2 (Freeze).

2.5.6.3 If the bin full sensors are blocked for BIN FULL MIN seconds and MINIMUM HARVEST TIME DEFAULT is reached proceed to 2.8 (Bin Full).

2.5.6.4 After MINIMUM HARVEST TIME DEFAULT seconds, proceed to 2.2 (Freeze).

If the FREEZE switch is pressed anytime during the forced harvest (2.5.6.1 thru 2.5.6.4) proceed immediately to 2.2 (Freeze).

2.6 Manual Harvest 2.6.1 Manual harvest is initiated by depressing the "HARVEST" switch while in a Freeze cycle or from the OFF mode. A manual harvest will cause the OFF indicator to flash indicating that the controller will go to shutdown upon completion of the manual harvest. Pressing the "FREEZE" switch during manual harvest will cause the OFF indicator to turn off and will cause the controller to return to the freeze mode upon completion of the manual harvest.

2.6.2 Proceed to initiate the harvest cycle.

2.7 Clean Cycle

Initial Conditions:
Water Level . . . Unknown
Condenser Fan . . . Unknown
Water Inlet Solenoid . . . Unknown
Water Pump . . . Unknown
Compressor . . . Unknown
Hot Gas Solenoid . . . Unknown 2.7.1 Blink or continue to blink the CLEAN indicator.

2.7.2 Turn off Compressor, Fan or Liquid Line Solenoid, and Water Pump. Close Water Solenoid and Hot Gas Solenoid.

2.7.3 Open the Water Solenoid. If Sump Full is not detected within SUMP FILL TIME MAX sec., set the Water Inlet Solenoid fault flag and proceed to 2.9.2 (WATER Fault). If both the Sump Full and Sump Harvest beams are blocked, continue filling until only Sump Full beam is blocked or SUMP FILL TIME MAX seconds has elapsed. Close the Water Solenoid.

2.7.4 Once the sump is full and WATER DISTRIBUTION TUBE DRAIN TIME has elapsed from the start of the clean cycle, turn on the Water Pump to fill the system. This will remove sufficient water from the sump to allow room for the cleaning or sanitizing solution.

2.7.5 The clean cycle can be initiated by:

2.7.5.1 manually depressing the "CLEAN" switch or a signal from an external processor.

2.7.6 Allow the system to circulate until the clean button is pressed. When the clean button is pressed proceed to 2.7.7. Turn the CLEAN indicator on continuously.

2.7.7 FOR OVERFLOW STANDPIPE SYSTEM 2.7.7.1 Open the water solenoid and allow to purge for a time equal to CLEAN RINSE FILL TIME. Close the water solenoid.

2.7.7.2 Allow water to circulate for CLEAN RINSE TIME.

2.7.7.3 Repeat 2.7.7 and 2.7.8 until the freeze or off button is pressed.

2.7.7.4 If the freeze button is pressed, proceed to freeze.

2.7.7.5 If the off button is pressed, proceed to shutdown.

2.7.7.6 If power is interrupted during any portion of the cleaning or rinsing cycles or while waiting for a key press, turn on the CLEAN indicator continuously.

2.7.7.7 Open the water inlet solenoid if the sump is not full. If sump full is not detected within SUMP FILL TIME MAX seconds, set the water inlet solenoid fault and proceed to 2.9.2 (Water Fault).

2.7.7.8 Turn on the water pump.

2.7.7.9 Proceed to 2.7.7 to initiate the rinse cycle.

2.7.8 FOR PURGE VALVE SYSTEM 2.7.8.1 Turn on water pump.

2.7.8.2 Open Hot Gas Solenoid for 10 seconds.

2.7.8.3 Refill sump to full level.

2.7.8.3 Let water pump run until clean button is pressed again.

2.7.8.4 When clean button is pressed turn on HGV for EEPROM seconds.

2.7.8.5 Refill sump.

2.7.8.6 Continue to purge and refill until off or freeze buttons are pressed.

2.7.9 Purge Function 2.7.9.1 To begin the Purge function, press the clean button and hold down for 3 seconds. This will turn on the HGV and water pump for EEPROM seconds.

2.7.9.2 The OFF indicator will flash. During this time, all keypress function will be ignored except for OFF.

2.7.9.3 When purging is complete, will return to shutdown mode.

2.9 Fault Processing 2.9.1 When a Refrigeration Fault has been sensed, store the Fault Code. Blink the indicator as shown in table 2.9. Repeat the blinking of the indicator every 2 seconds. Proceed to 2.4 (Shutdown).

2.9.2 When a Water Fault has been sensed, store the Fault Code. Blink the indicator as shown in table 2.9. Repeat the blinking of the indicator every 2 seconds. Proceed to 2.4 (Shutdown).

2.9.3 If the A/D routine detects a fault (temperature), the controller will turn on the A/D indication per the Fault Coding Table 2.9, and continue to operate using default values as described below. The A/D fault will continue to be displayed for as long as the fault exists. The fault lights will turn off if the A/D fault is cleared.

While the controller is operating with an A/D fault, the A/D reading stored in RAM will remain at the value of the last valid reading. Other software routines which make decisions based on the current A/D reading will either use the last valid reading or default their decision in the following manner:

2.9.3.2 Discharge Temperature Fault

The End of Cycle Fan Off Delay will default to EOCFOD #3 in Freeze mode.

The compressor test in Diagnostics will be ignored.

TABLE 2.9

Fault Coding

| PROBLEM | LED | FLASH COUNT |
|---|---|---|
| General Water | Water | Continuous |
| Water Pump | Water | 1 |
| Water Inlet Solenoid | Water | 2 |
| General Refrigeration (Low Discharge or Long Freeze) | Refrigeration | Continuous |
| Harvest Problem - Cubes Sensed | Refrigeration | 1 |
| Harvest Problem - No Cubes Sensed | Refrigeration | 2 |
| High Discharge | Refrigeration | 3 |
| Temperature Sensor Out of Range | Water & Refrigeration | Continuous |

Indicators shall be flashed on for 0.3 seconds separated by 0.3 seconds off.

2.10 Communications

Any data value stored in RAM or EEPROM shall be transmitted upon request. EEPROM data may be modified by transmitting the proper programming command to the controller.

Communications protocol with the controller is set at 600 baud, 1 start bit and 1 stop bit.

Note: If a fault has not been acknowledged by the user (by pressing the off button to clear the fault display) the fault code will be shared as the fault code value +128. This allows the control to return with the fault code displayed in the event of a power loss.

2.12 Decimal to Temperature Conversion

Sump Temperature and Discharge Temperature Values in the EEPROM are stored decimal numbers.

2.13 Keyboard Recognition

During normal operation the controller will respond to a keypress by either blinking the appropriate indicator on and off indicating that the controller will change to the desired mode once the current operation is complete or will turn on the indicator full and immediately change to the desired mode as outlined throughout this document.

2.13.1 Pressing the "OFF" button for greater than 3 seconds will cause the controller to immediately shut down regardless of the current operating mode.

2.13.2 When the machine detects a fault other than a TEMPERATURE SENSOR OUT OF RANGE, only the "OFF" key will be recognized as a valid keypress. Pressing the "OFF" key during this time will clear displayed faults and restore normal keyboard operation.

2.13.3 A TEMPERATURE SENSOR OUT OF RANGE fault allows for normal keyboard operation. The fault display is not cleared when the "OFF" key is pressed. The fault display will be cleared once a valid (in-range) temperature is sensed.

3 SWITCHING

All switches except for the main power switch are to be miniature micro switches mounted on the board in a manner to allow a decal overlay on the control box cover with the following key pads:

3.1 The following switches are accessible from the top of the control package:

FREEZE; HARVEST; OFF; CLEAN 3.2 Simultaneous switch presses will not be recognized with the exception of the "OFF" key which will always be recognized regardless of other keys being pressed.

3.3 In order for a keypress to be accepted, the key must remain pressed for a minimum of 100 ms. A "no keypress" condition must exist between consecutive key presses in order for each key to be accepted.

4 LIGHTS

Indicators are to be provided for the following:

| FAULTS | | STATUS | |
|---|---|---|---|
| 4.1 WATER | RED | 4.3 FREEZE | GREEN |
| 4.2 REFRIGERATION | RED | 4.4 HARVEST | GREEN |
| | | 4.5 CLEAN | GREEN |
| | | 4.6 OFF | GREEN |
| | | 4.7 BIN FULL | GREEN |

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for monitoring and resuming operation of an icemaker after a fault is detected by a controller of said icemaker which has caused a shut down of operation of said icemaker, the method comprising the steps of:

incrementing a Fault Restart Tries (FRT) counter after a first fault has been detected which has caused a shutdown of said icemaker;

waiting a predetermined time before attempting to restart the icemaker;

restarting said icemaker;

if said controller detects a second fault before said icemaker completes a cycle of operation, incrementing said FRT counter;

comparing the count of said FRT counter to a predetermined maximum value;

if said count of said FRT counter is equal to said predetermined maximum value, causing said controller to generate a fault signal and suspending operation of said icemaker; and if said count of said FRT counter is not equal to said predetermined maximum value, restarting said icemaker and attempting to execute a cycle of operation.

2. The method of claim 1, further comprising the steps of:

if said icemaker completes said cycle of operation following one of said faults, then exiting said method.

3. The method of claim 2, further comprising the steps of:

if said icemaker does not complete said cycle of operation without incurring another fault condition, then again incrementing said FRT counter and again checking to determine if said value of said FRT counter equals said maximum predetermined value; and if said value of said FRT counter does not equal said maximum predetermined value, then waiting said predetermined time before again restarting said icemaker.

4. The method of claim 1, further comprising the steps of:

making a determination if said first fault relates to a general fault condition;

starting a general fault restart time (GFRT) timer if said first fault has been determined to be a general fault condition; and waiting a predetermined first time period before restarting said icemaker.

5. The method of claim 4, further comprising the steps of:

if said first fault is not determined to be a general fault condition, then starting a water inlet fault restart timer (WIFRT); and waiting for a second predetermined time period in lieu of said predetermined time before restarting said icemaker.

6. The method of claim 5, further comprising the step of:

if said first fault is not determined to be a general fault, then bypassing the step of incrementing said FRT counter prior to restarting said icemaker a second time.

7. A method for resuming operation of an icemaker after a fault is detected by a controller of said icemaker, which fault has resulted in a shutdown of said icemaker, said method comprising the steps of:

determining if said fault relates to a first error condition or a second error condition;

if said fault relates to said first error condition, then incrementing a fault restart tries (FRT) counter after said fault condition has been detected by said controller;

if said fault relates to said second error condition, then bypassing incrementing of said FRT counter;

waiting a first predetermined time period;

after said first predetermined time period has expired, causing said controller to execute a fault restart sequence to restart said icemaker despite said detected fault condition;

causing said controller to monitor operation of said icemaker during a cycle of operation following said fault restart sequence, and if a second fault condition is detected, again determining if said second fault condition relates to a first error condition or a second error condition, and incrementing said FRT counter only if said second fault condition relates to said first error condition, and comparing a count of said FRT counter with a predetermined maximum FRT value;

if said count of said FRT counter equals said predetermined maximum FRT value, causing said controller to generate a fault signal and shutting down said icemaker; and if said predetermined maximum FRT value is less than said count of said FRT counter, then waiting for said first predetermined time period and causing said controller to again execute said automatic restart sequence regardless of said detected second fault condition.

8. The method of claim 7, further comprising the steps of:

determining if, after restarting said icemaker said cycle of operation is performed without the occurrence of a second fault condition; and if said cycle of operation is performed without the occurrence of said second fault condition, then exiting said method.

9. A method for monitoring and resuming operation of an icemaker after a fault is detected which has caused said icemaker to shut down, said method comprising the steps of:

detecting the occurrence of a first fault;

determining if said first fault is a type of fault relating to an error condition other than an insufficient water supply condition;

if said fault relates to insufficient water supply conditions, then waiting a predetermined time period before restarting said icemaker;

if said fault does not relate to said insufficient water supply condition, then waiting said predetermined time period then incrementing a fault restart tries (FRT) timer before restarting said icemaker;

monitoring operation of said icemaker to determine if said icemaker completes a predetermined cycle of operation without experiencing a second fault;

if said icemaker experiences a second fault, again checking to determine if said fault relates to an insufficient water supply condition and, if not, then incrementing said FRT counter;

determining if a count of said FRT counter equals a maximum predetermined value;

if said count of said FRT counter does not equal said maximum predetermined value, then restarting said icemaker; and if said count of said FRT counter equals said maximum predetermined value, then generating a fault signal and aborting further attempts at restarting said icemaker.

\* \* \* \* \*